US011192552B2

(12) United States Patent
Niewiadomski et al.

(10) Patent No.: US 11,192,552 B2
(45) Date of Patent: Dec. 7, 2021

(54) VEHICLE MOTION CONTROL FOR TRAILER ALIGNMENT

(71) Applicant: Ford Global Technologies, LLC, Dearborn, MI (US)

(72) Inventors: Luke Niewiadomski, Dearborn, MI (US); Li Xu, Northville, MI (US); Eric Hongtei Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 16/440,547

(22) Filed: Jun. 13, 2019

(65) Prior Publication Data
US 2020/0391744 A1 Dec. 17, 2020

(51) Int. Cl.
| | |
|---|---|
| *G05D 1/00* | (2006.01) |
| *B60W 30/18* | (2012.01) |
| *B62D 15/02* | (2006.01) |
| *B60D 1/36* | (2006.01) |
| *B60W 10/18* | (2012.01) |
| *B60W 10/20* | (2006.01) |
| *G05D 1/02* | (2020.01) |
| *B60W 10/04* | (2006.01) |

(52) U.S. Cl.
CPC ...... *B60W 30/18109* (2013.01); *B60W 30/18036* (2013.01); *G05D 1/0022* (2013.01); *B60D 1/36* (2013.01); *B60W 10/04* (2013.01); *B60W 10/18* (2013.01); *B60W 10/20* (2013.01); *B60W 2420/42* (2013.01); *B62D 15/0285* (2013.01); *G05D 1/0033* (2013.01); *G05D 1/0246* (2013.01)

(58) Field of Classification Search
CPC ..... B60W 30/18036; B60W 30/18109; B60W 10/04; B60W 10/18; B60W 10/20; B60W 2420/42; B62D 15/0285; G05D 1/0022; G05D 1/0033; G05D 1/0223; G05D 1/0246; G05D 2201/0213; B60D 1/36; B60D 1/363; B60D 1/38
USPC .................................. 701/70, 79, 96, 110
See application file for complete search history.

(56) References Cited

U.S. PATENT DOCUMENTS

| | | | |
|---|---|---|---|
| 3,519,805 A | 7/1970 | Throne-Booth | |
| 3,921,946 A | 11/1975 | Norton et al. | |
| 4,578,754 A | 3/1986 | Sahasrabudhe et al. | |
| 5,018,689 A | 5/1991 | Yasunobu et al. | |

(Continued)

FOREIGN PATENT DOCUMENTS

JP 2012148699 A 8/2012

*Primary Examiner* — B M M Hannan
(74) *Attorney, Agent, or Firm* — Raymond Coppiellie; Price Heneveld LLP

(57) ABSTRACT

A vehicle control system is configured to control a braking operation of a hitch ball to a coupler on a trailer. The system comprises a controller in communication with a maneuvering system and a sensor system. The controller is configured to control the maneuvering system to maneuver the vehicle along a vehicle path and monitor a coupler distance from the hitch ball to the coupler via the sensor system. The controller is further configured to control a deceleration procedure configured to decrease a velocity of the vehicle along a deceleration profile and stop the vehicle with the hitch ball aligned with the coupler. During the procedure, the controller may detect a premature stop condition of the vehicle, where the coupler distance is greater than zero.

19 Claims, 12 Drawing Sheets

(56) References Cited

U.S. PATENT DOCUMENTS

| | | | |
|---|---|---|---|
| 6,056,374 A | 5/2000 | Hiwatashi | |
| 6,280,004 B1* | 8/2001 | Greaves, Jr. | B60T 7/20 |
| | | | 188/3 R |
| 6,577,334 B1 | 6/2003 | Kawai et al. | |
| 9,073,524 B2* | 7/2015 | Cusi | B60T 8/1708 |
| 9,550,399 B2* | 1/2017 | Jones | B60T 7/20 |
| 2005/0074143 A1* | 4/2005 | Kawai | B62D 13/06 |
| | | | 382/104 |
| 2005/0121879 A1* | 6/2005 | Smith | B60D 1/36 |
| | | | 280/477 |
| 2006/0290100 A1* | 12/2006 | Miller | B60D 1/36 |
| | | | 280/477 |
| 2007/0208482 A1 | 9/2007 | Thiede et al. | |
| 2011/0216199 A1* | 9/2011 | Trevino | B60D 1/36 |
| | | | 348/148 |
| 2014/0012465 A1* | 1/2014 | Shank | B62D 15/0285 |
| | | | 701/36 |
| 2015/0203117 A1 | 7/2015 | Kelly et al. | |
| 2015/0217767 A1 | 8/2015 | Kelly et al. | |
| 2016/0185350 A1 | 6/2016 | Kelly | |
| 2016/0378118 A1* | 12/2016 | Zeng | B60D 1/62 |
| | | | 701/28 |
| 2017/0043807 A1* | 2/2017 | Shepard | B60D 1/36 |
| 2017/0282658 A1* | 10/2017 | Shepard | B62D 15/028 |
| 2018/0029429 A1* | 2/2018 | Janardhana | B62D 15/028 |
| 2018/0253106 A1* | 9/2018 | Inui | B60W 30/0956 |
| 2019/0086927 A1* | 3/2019 | Skvarce | G05D 1/0212 |
| 2019/0256113 A1* | 8/2019 | Filippone | B61L 23/042 |
| 2019/0340787 A1* | 11/2019 | Ramirez Llanos | G05D 1/0251 |
| 2019/0366929 A1* | 12/2019 | Maruoka | B60R 16/023 |
| 2019/0389260 A1* | 12/2019 | Niewiadomski | B60R 11/04 |
| 2019/0389261 A1* | 12/2019 | Zhang | B60W 50/14 |
| 2020/0039517 A1* | 2/2020 | Berkemeier | G05D 1/0231 |
| 2020/0101897 A1* | 4/2020 | Miller | B60Q 9/008 |
| 2020/0361466 A1* | 11/2020 | Xu | B60W 10/04 |

* cited by examiner

US 11,192,552 B2

VEHICLE MOTION CONTROL FOR TRAILER ALIGNMENT

FIELD OF THE DISCLOSURE

The present disclosure generally relates to a system for assisting in a vehicle-trailer hitching operation. In particular, the present disclosure relates to a system for guiding a vehicle to connect a trailer coupler.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. The disclosure may provide for various features and operating methods that may improve a vehicle hitching process.

SUMMARY OF THE INVENTION

According to one aspect of the present disclosure, a vehicle control system configured to control a braking operation of a hitch ball to a coupler on a trailer is disclosed. The system comprises a controller in communication with a maneuvering system and a sensor system. The controller is configured to control the maneuvering system to maneuver the vehicle along a vehicle path and monitor a coupler distance from the hitch ball to the coupler via the sensor system. The controller is further configured to control a deceleration procedure configured to decrease a velocity of the vehicle along a deceleration profile and stop the vehicle with the hitch ball aligned with the coupler. During the procedure, the controller may detect a premature stop condition of the vehicle, where the coupler distance is greater than zero. The controller is therefore configured to control the vehicle to accelerate, and, in response to the velocity of the vehicle intersecting the deceleration profile, the controller is configured to control the deceleration procedure to decrease the velocity of the vehicle along the deceleration profile.

Implementations of aspects of the disclosure can include any one or a combination of the following features:
- the deceleration profile comprises a predetermined rate of the velocity of the vehicle dependent on the coupler distance;
- the deceleration profile comprises an increasing rate of deceleration in response to a decrease of the coupler distance;
- the controller is further configured to calculate an intersection with the deceleration profile based on a predetermined acceleration rate;
- the controlling of the vehicle to accelerate is based on the predetermined acceleration rate;
- the premature stop condition results from a variation in an operating surface of the vehicle that is encountered by the vehicle along the vehicle path;
- the controller is further configured to limit an engine speed of the vehicle through at least a portion of the maneuvering of the vehicle;
- the limit of the engine speed of the vehicle decreases relative to the remaining coupler distance;
- the engine speed is limited in addition to the velocity of the vehicle throughout the maneuvering of the vehicle;
- the engine speed is limited to prevent an overshoot of the coupler distance resulting in the hitch ball passing a location of the coupler;
- the controller is further configured to detect at least one change in a braking parameter of the vehicle; and in response to the change in the braking parameter, adjust the deceleration profile based on a change in a stopping distance resulting from the change in the braking parameter; and/or
- the braking parameter comprises at least one of a change in the velocity, a change in a brake pressure, a change in a grade of an operating surface of the vehicle encountered by the vehicle, and a change in a terrain feature of the operating surface encountered by the vehicle.

According to another aspect of the present disclosure, a method for controlling a braking operation of a vehicle is disclosed. The method comprises controlling a maneuver of the vehicle along a vehicle path, monitoring a coupler distance from a hitch ball to a coupler, and initiating a deceleration procedure configured to decrease a velocity of the vehicle along a deceleration profile. The deceleration procedure is configured to stop the vehicle with the hitch ball aligned with the coupler. The method further comprises detecting a premature stop condition of the vehicle, wherein the coupler distance is greater than zero. In response to the premature stop condition, the method may control the vehicle to accelerate, and in response to the velocity of the vehicle intersecting the deceleration profile, the method may control the deceleration procedure to decrease the velocity of the vehicle along the deceleration profile.

Implementations of aspects of the disclosure can include any one or a combination of the following features:
- the premature stop condition results from at least one of a change in a vehicle brake state, a change in a grade of an operating surface, and a change in terrain feature encountered by the vehicle;
- the deceleration profile comprises a predetermined rate of the velocity of the vehicle dependent on the coupler distance and comprises an increasing rate of deceleration in response to decreasing the coupler distance;
- further comprising calculating an intersection with the deceleration profile based on a predetermined acceleration rate;
- the controlling of the vehicle to accelerate is based on the predetermined acceleration rate;
- further comprising limiting an engine speed of the vehicle through at least a portion of the maneuvering of the vehicle;
- the limit of the engine speed of the vehicle decreases relative to the remaining coupler distance; and/or
- the engine speed is limited in addition to the velocity of the vehicle throughout the maneuvering of the vehicle.

According to yet another aspect of the present disclosure, a vehicle control system configured to control a braking operation of a hitch ball to a coupler on a trailer is disclosed. The system comprises a controller in communication with a maneuvering system and a sensor system. The controller is configured to control the maneuvering system to maneuver the vehicle along a vehicle path and monitor a coupler distance from the hitch ball to the coupler via the sensor system. The controller is further configured to limit an engine speed of the vehicle through at least a portion of the maneuvering of the vehicle. The engine speed is limited based on the coupler distance and decreases in response to the coupler distance decreasing. The controller is further configured to control a deceleration procedure configured to decrease a velocity of the vehicle along a deceleration profile and stop the vehicle with the hitch ball aligned with the coupler.

These and other aspects, objects, and features of the present disclosure will be understood and appreciated by those skilled in the art upon studying the following specification, claims, and appended drawings.

DETAILED DESCRIPTION OF THE PREFERRED IMPLEMENTATIONS

Figure 1:
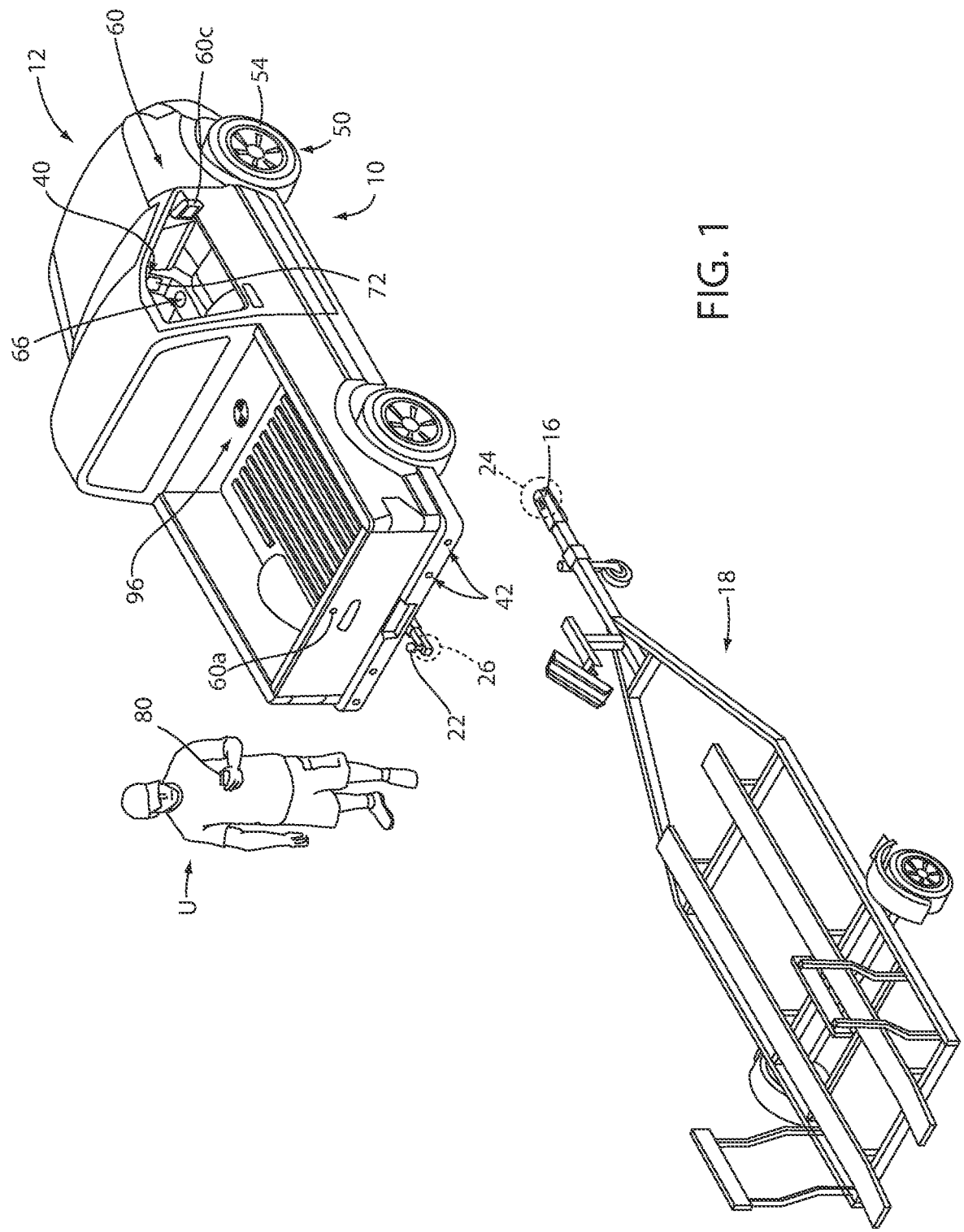
FIG. 1 is a perspective view of a vehicle in an unhitched position relative to a trailer.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary implementations of the inventive concepts defined in the appended claims. Hence, specific dimensions and other physical characteristics relating to the implementations disclosed herein are not to be considered as limiting, unless the claims expressly state otherwise. Additionally, unless otherwise specified, it is to be understood that discussion of a particular feature or component extending in or along a given direction or the life does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various implementations, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in an operating direction or a steering direction of the vehicle 12. In various implementations, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In operation, the system 10 may track a position of the trailer 18 and the coupler position 24 in image data or various sensory data captured by the vehicle 12 while maneuvering the vehicle 12 along the path 20. For successful operation, the tracking of the trailer 18 should be sufficiently accurate to ensure that the coupler position 24 remains within a maneuvering range of the vehicle 12. Such tracking of the trailer 18 and/or the coupler 16 may be accomplished by processing image data captured via an imaging system 60. An example of an imaging system is discussed later in reference to FIGS. 2 and 4.

In some implementations, the system 10 may be configured to process the image data or sensory data captured by the imaging system 60 via a point tracking method. The point tracking method may be configured to track portions of the image data (e.g. edges, objects, homogeneous portions, etc.) as the vehicle 12 is maneuvered by processing a temporal sequence of image data (e.g. image frames) captured by the imaging system 60 throughout maneuvering operations of the vehicle 12. The portions of the image data identified in the scene captured by the imaging system 60 may be configured to process the image data to optimize the detection of the coupler 16 relative to the hitch ball 22. Accordingly, the system 10 may be configured to identify the coupler position 24 of the coupler 16 in the image data to provide a robust approximation of the location in a variety of diverse situations that may create challenges.

Figure 2:
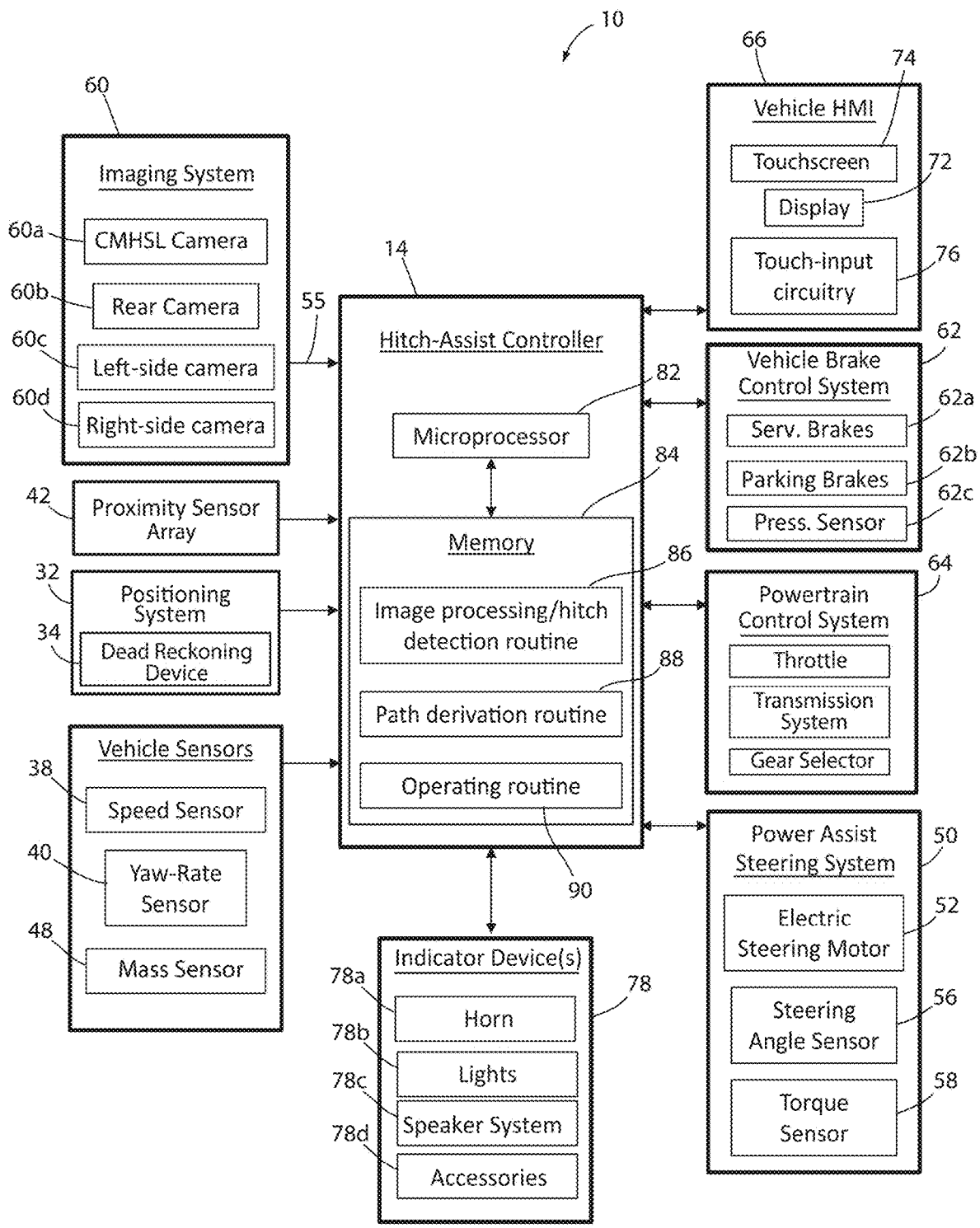
FIG. 2 is a diagram of a system according to an aspect of the disclosure for assisting in aligning the vehicle with a trailer in a position for hitching the trailer to the vehicle.
Figure 3:
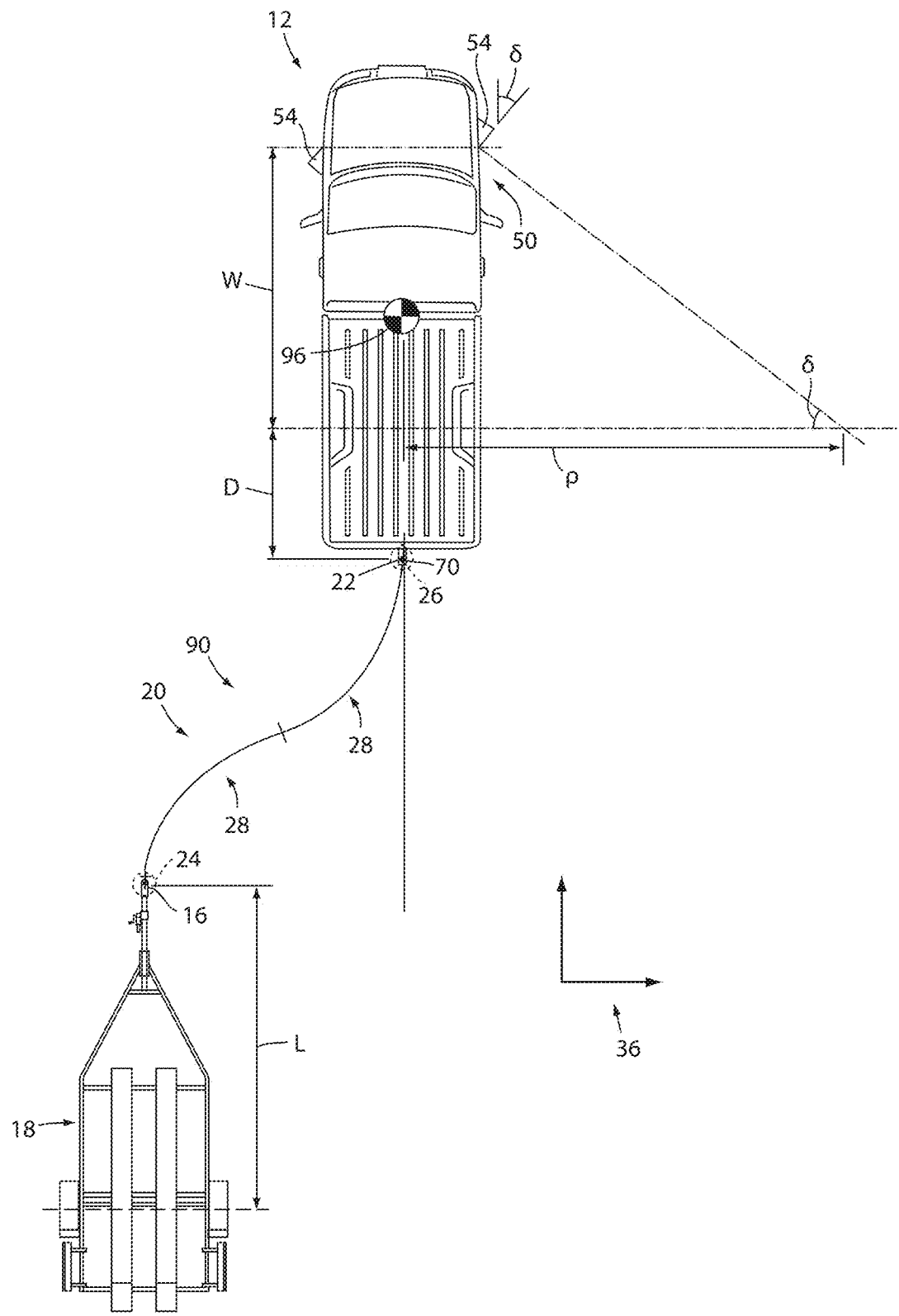
FIG. 3 is a plan view of a vehicle during a step of the alignment sequence with the trailer.
Figure 4:
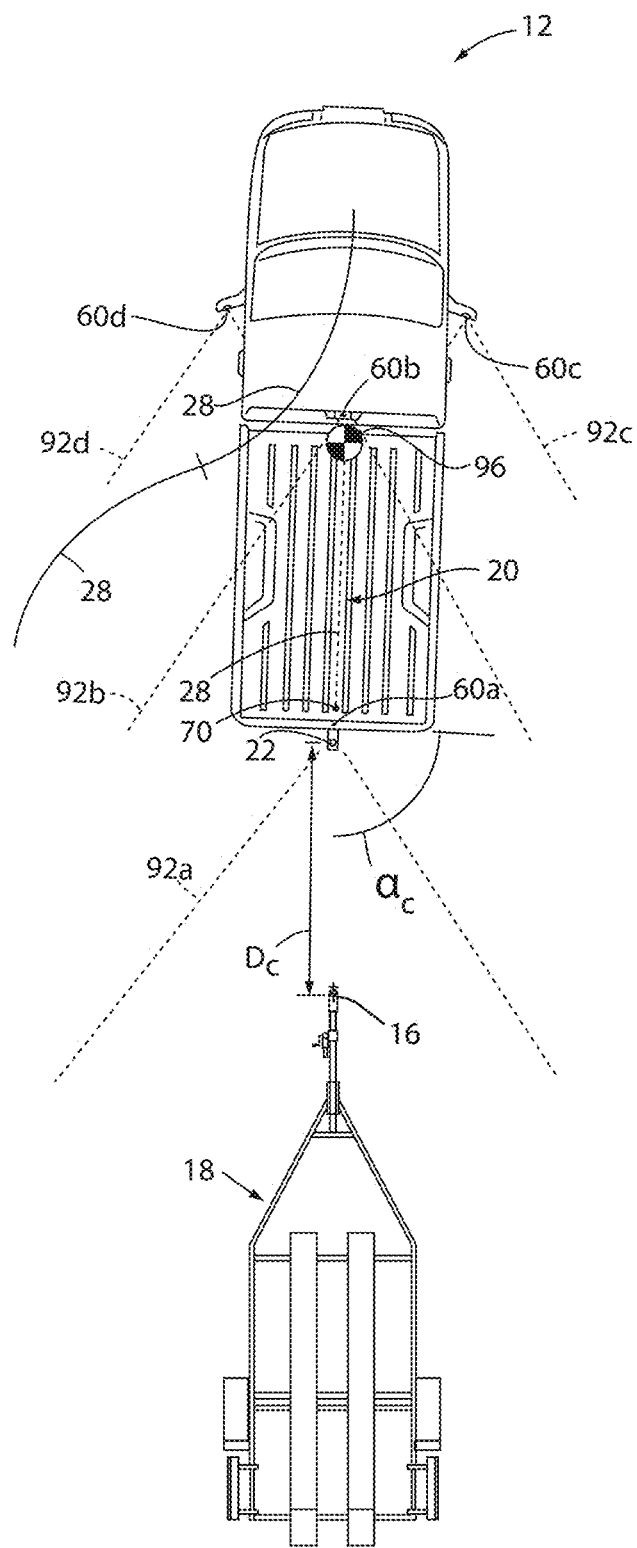
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead-reckoning device 34 and/or, in addition or as an alternative, a global positioning system (GPS), to determine a coordinate location of the vehicle 12 based on the one or more locations of the devices within the positioning system 32. In particular, the dead-reckoning device 34 can establish and track the coordinate location of the vehicle 12 within a localized coordinate system 36 based at least on vehicle speed and steering angle δ as shown in FIG. 3. Other vehicle information received by the hitch assist system 10 may include a speed of the vehicle 12 from a speed sensor 38 and a yaw rate of the vehicle 12 from a yaw rate sensor 40. Other additional information received by the hitch assist system 10 may include a pressure sensor 46 to detect the brake pressure of the vehicle 12 or a vehicle mass sensor 48 to detect the mass of the vehicle 12. It is contemplated that in additional implementations, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of the coupler 16.

In some implementations, the system 10 may be configured in an autonomous or automated driving setting to accurately stop the vehicle 12 in alignment with the trailer 18. Without appropriate control, as provided by the disclosure, fluctuations in brake pressure build up and can result in a harsh deceleration or acceleration as the vehicle 12 approaches the coupler 16. As discussed herein, the brake pressure of the vehicle 12 may be controlled via a brake control system 62. In order to control the approach of the hitch ball 22 to align with the coupler 16, the hitch assist system 10 may also be configured to monitor the speed of the vehicle 12, calculate the braking distance as the vehicle 12 approaches the coupler 16, and detect the change in the speed of the vehicle 12. The change in speed may be the result of a powertrain control system 64 of the vehicle adjusting a throttle to compensate for changes in terrain. The system 10 may also frequently update the calculation of the braking distance as the hitch ball 22 of the vehicle 12 approaches the coupler 16 of the trailer 18 based on various braking parameters of the vehicle 12.

As further discussed herein, changes in the terrain on which the vehicle 12 is operating and the corresponding adjustment in the throttle of the vehicle 12 may result in variations in speed and acceleration that may complicate both the alignment and the deceleration of the vehicle 12. In response to such variations, the controller 14 of the hitch assist system 10 may be configured to respond by limiting a throttle response or increase to overcome objects encountered along the path 20. Additionally, the controller 14 may be configured to control the acceleration of the vehicle 12 to smoothly accelerate and decelerate in response to an unexpected stoppage of the vehicle 12 occurring near an alignment position between the hitch ball 22 and the coupler 16. Accordingly, the disclosure provides for solutions to improve the operation of the vehicle 12 such that the hitch ball 22 may be accurately aligned with the coupler 16 while maintaining smooth acceleration and deceleration. Further detailed discussion of the motion control of the vehicle is discussed in reference to FIGS. 5-9.

As discussed herein, the changes in terrain may correspond to any variation in the operating surface along the path 20 and/or over which the vehicle 12 is maneuvered. Such variations may be the result of changes in a texture, level, grade, and/or flatness of the operating surface of the vehicle 12. As further discussed in reference to FIG. 8, the changes in the terrain may be referred to as an obstruction. The variations or obstructions may correspond to an abrupt change in an operating surface or grade of the operating surface including a variation in a terrain feature (a rock, a root, organic material, curb, drain, etc.) that may be encountered by the vehicle 12. Accordingly, the system 10 may be configured to control the motion of the vehicle 12 in a variety of diverse operating conditions and corresponding operating surfaces to provide improved operation of the vehicle 12.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 (see FIG. 3) of the vehicle 12, such that the steering wheel moves in concert with steered wheels 54 (see FIG. 3), preventing manual intervention with the steering wheel during autonomous steering. More specifically, a torque sensor 58 is provided on the power assist steering system 50 that senses torque on the steering wheel that is not expected from autonomous control of the steering wheel and, therefore, indicative of manual intervention. In this configuration, the hitch assist system 10 may alert the driver to discontinue manual intervention with the steering wheel and/or discontinue autonomous steering. In alternative implementations, some vehicles have a power assist steering system 50 that allows a steering wheel to be partially decoupled from the movement of the steered wheels 54 (see FIG. 3) of such a vehicle.

With continued reference to FIG. 2, the power assist steering system 50 provides the controller 14 of the hitch assist system 10 with information relating to a rotational position of the steered wheels 54 (see FIG. 3) of the vehicle 12, including a steering angle δ. The controller 14 in the illustrated embodiment processes the current steering angle, in addition to other conditions of the vehicle 12 in order to guide the vehicle 12 along the desired path 20 (FIG. 3). It is conceivable that the hitch assist system 10, in additional implementations, may be an integrated component of the power assist steering system 50. For example, the power assist steering system 50 may include a hitch assist algorithm for generating vehicle steering information and commands as a function of all or a portion of information received from an imaging system 60, the power assist steering system 50, the vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The brake pressure of the service brakes 62a may be monitored by at least one brake pressure sensor 62c. The parking brake 62b may correspond to an electronic parking brake system that may be in communication with the controller 14. Determination of the brake pressure command may comprise the monitoring and evaluation by the controller 14 of a number of braking parameters. The braking parameters may include but are not limited to a traveling velocity, acceleration, distance $D_c$ to the coupler 16, current brake pressure, pressure build rate, minimum pressure to maintain standstill, vehicle mass, tire radius, an operating surface grade, terrain features of the operating surface, etc. Accounting for these braking parameters may be imperative to accurately control the motion of the vehicle 12.

Accordingly, in operation, the controller 14 may be configured to control the brakes 62a and 62b as well as to detect vehicle brake pressure information, which may be determined from the pressure sensor 62c and the vehicle mass sensor 48. The controller 14 may also be configured to detect speed information, which may be determined from individual wheel speed sensors monitored by the brake control system 62. Vehicle speed may also be determined from the powertrain control system 64, the speed sensor 38, and/or the positioning system 32, among other conceivable means. In some implementations, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the vehicle 12 to the trailer 18. For example, the hitch assist system 10, in some implementations, may regulate speed of the vehicle 12 during alignment of the vehicle 12 with the coupler 16 of trailer 18, which can reduce the potential for contact between the vehicle 12 and the trailer 18, and can bring vehicle 12 to a complete stop at a determined endpoint 70 (see FIG. 3) of the path 20 (see FIG. 3). It is disclosed herein that the hitch assist system 10 may additionally or alternatively issue an alert signal corresponding to a notification of an actual, impending, and/or anticipated contact between the vehicle 12 and the trailer 18. Thus, regulation of the speed of the vehicle 12 may be advantageous to prevent contact with trailer 18, which may otherwise result due to unexpected changes in the motion of the vehicle 12.

In some examples, the disclosure may provide for beneficial methods and systems that may be operable to control the deceleration of the vehicle by controlling a brake pressure of the brake control system 62. The vehicle brake control system 62 may be a conventional brake system, which dissipates the vehicle kinetic energy through friction or a regenerative braking system. The vehicle brake control system 62 may also correspond to a regenerative brake system or other types that may convert the vehicle kinetic energy to hydraulic or air potential energy (e.g. an accumulator in hydraulic hybrid vehicles) or chemical energy (e.g. battery in electrified vehicle system). In this disclosure, the brake pressure is the control factor. Some implementations may replace the brake pressure with a brake torque.

In some implementations, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some implementations, the controller 14 may be configured to control a gear of the transmission system and/or prompt the user U to shift to a desired gear to complete semi-automated operations of the vehicle 12.

Continuing in reference to FIG. 2, the hitch assist system 10 may communicate with a human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some implementations, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some implementations, the indicator devices 78 may further include one or more accessories 78d, which may correspond to communication devices, remote controls, and a variety of devices that may provide for status and operational feedback between the user U and the vehicle 12. For example, in some implementations, the HMI 66, the display 72, and the touchscreen 74 may be controlled by the controller 14 to provide status updates identifying the operation or receiving instructions or feedback to control the hitch assist system 10. Additionally, in some implementations, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described vehicle sensors 44 and vehicle systems, including the indicator devices 78, the vehicle HMI 66, the imaging system 60, a maneuver system 30, the vehicle brake control system 62, and other vehicle sensors and devices. The maneuver system 30 may comprise a proximity sensor 42, positioning system 32, powertrain control system 64, power assist steering system 50, or other vehicle sensors and devices, which may relate to the maneuvering of the vehicle 12. The controller 14 may generate vehicle steering information and commands as a function of all or a portion of the information received. Thereafter, the vehicle steering information and commands may be provided to the power assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image-processing routine 86 and/or hitch detection routine, a path derivation routine 88, and an operating routine 90.

In order to accurately control the motion of the vehicle 12, the hitch assistance system 10 may monitor and control each of the brake control system 62 and the powertrain control system 64 based on data detected by the imaging system 60. Additionally, the controller 14 may monitor a variety of operating parameters, which may include the brake parameters of the brake pressure, the vehicle mass, and the vehicle speed. The brake pressure may be monitored via a pressure sensor 62c, which may be incorporated with the brake control system 62. The velocity may be monitored via the speed sensor 38, and the vehicle mass may be monitored via a vehicle mass sensor 48. Accordingly, the system 10 may monitor the braking parameters to control a deceleration and alignment of the vehicle 12 with the trailer 18 via the braking operation by monitoring the braking parameters and controlling various motion control systems of the vehicle as discussed herein.

It should be appreciated that the controller 14 may be a stand-alone dedicated controller or may be a shared controller integrated with other control functions, such as integrated with a vehicle sensor system 44, the power assist steering system 50, the braking control system 62, and other conceivable onboard or off-board vehicle control systems. It should further be appreciated that the image-processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes an image-processing functionality, such as that described herein, may be referred to herein as an "image processor" regardless of other functionality it may also implement (including simultaneously with executing image-processing routine 86).

Continuing in reference to FIG. 2, system 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which, in the depicted arrangement, include fields of view 92a, 92b, 92c, and 92d (see FIG. 4) to correspond with rear camera 60a, center high-mount stop light (CHMSL) camera 60b, and side-view cameras 60c and 60d, respectively. In this manner, image data from two or more of the cameras can be combined in image-processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d (see FIG. 4), including any objects (obstacles or coupler 16, for example) therein. In an embodiment, the use of two images including the same object can be used to determine a location of the object relative to the two image sources, given a known spatial relationship between the image sources. In this respect, the image-processing routine 86 can use known programming and/or functionality to identify an object within image data from the various cameras 60a, 60b, 60c, and 60d within imaging system 60. In either example, the image-processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image-processing routine 86 can be specifically programmed or otherwise configured to locate the coupler 16 within image data. In one example, the image-processing routine 86 can identify the coupler 16 within the image data based on stored or otherwise known visual characteristics of coupler 16 or hitches, in general. In another embodiment, a marker in the form of a sticker, or the like, may be affixed with trailer 18 in a specified position relative to the coupler 16 in a manner similar to that which is described in commonly-assigned U.S. Pat. No. 9,102,271, the entire disclosure of which is incorporated by reference herein. In such an embodiment, image-processing routine 86 may be programmed with identifying characteristics of the marker for location in image data, as well as the positioning of coupler 16 relative to such a marker so that the position 24 of the coupler 16 can be determined based on the marker location.

Additionally, or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in co-pending, commonly-assigned U.S. Pat. No. 10,266,023, the entire disclosure of which is incorporated by reference herein. The image-processing routine 86 can then correlate the location of the touch input with the coordinate system 36 applied to image data shown on the display 72, which may be depicted as shown in FIG. 3.

As shown in FIG. 3, the image-processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image-processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54, can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta} \quad (1)$$

in which the wheelbase W is fixed and the steering angle $\delta$ can be controlled by controller 14 by communication with steering system 50, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead-reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified known area) to determine the needed positioning of vehicle 12 to align hitch ball 22 with coupler 16. In this way, the vehicle 12 may execute the braking operation near the end of the path derivation routine 88.

Figure 5:
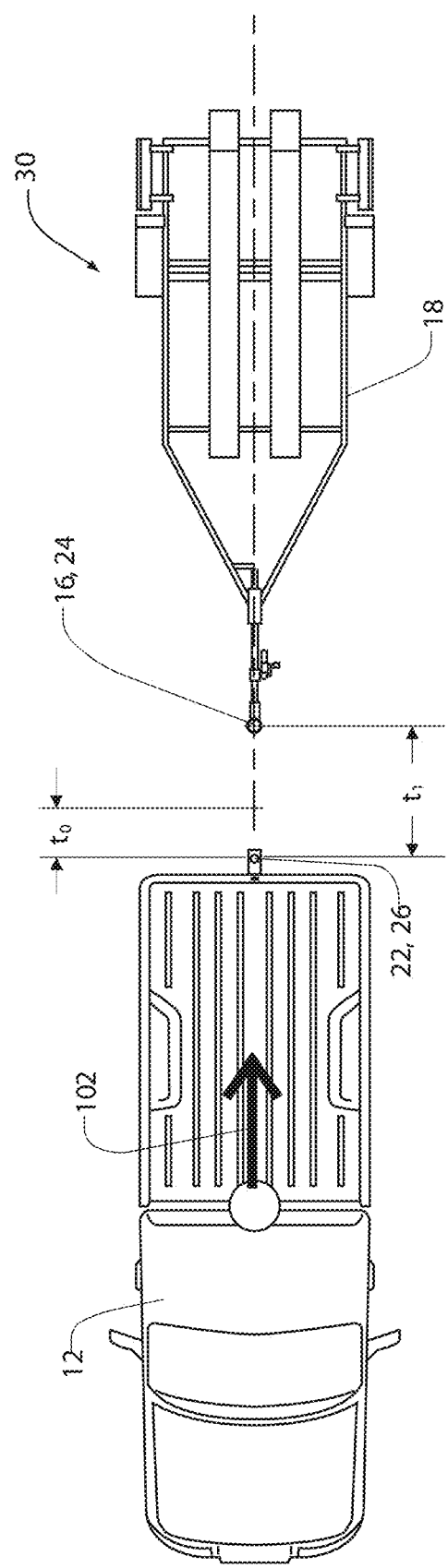
FIG. 5 is a perspective view of a vehicle approaching an aligned configuration with a trailer.
Figure 6:
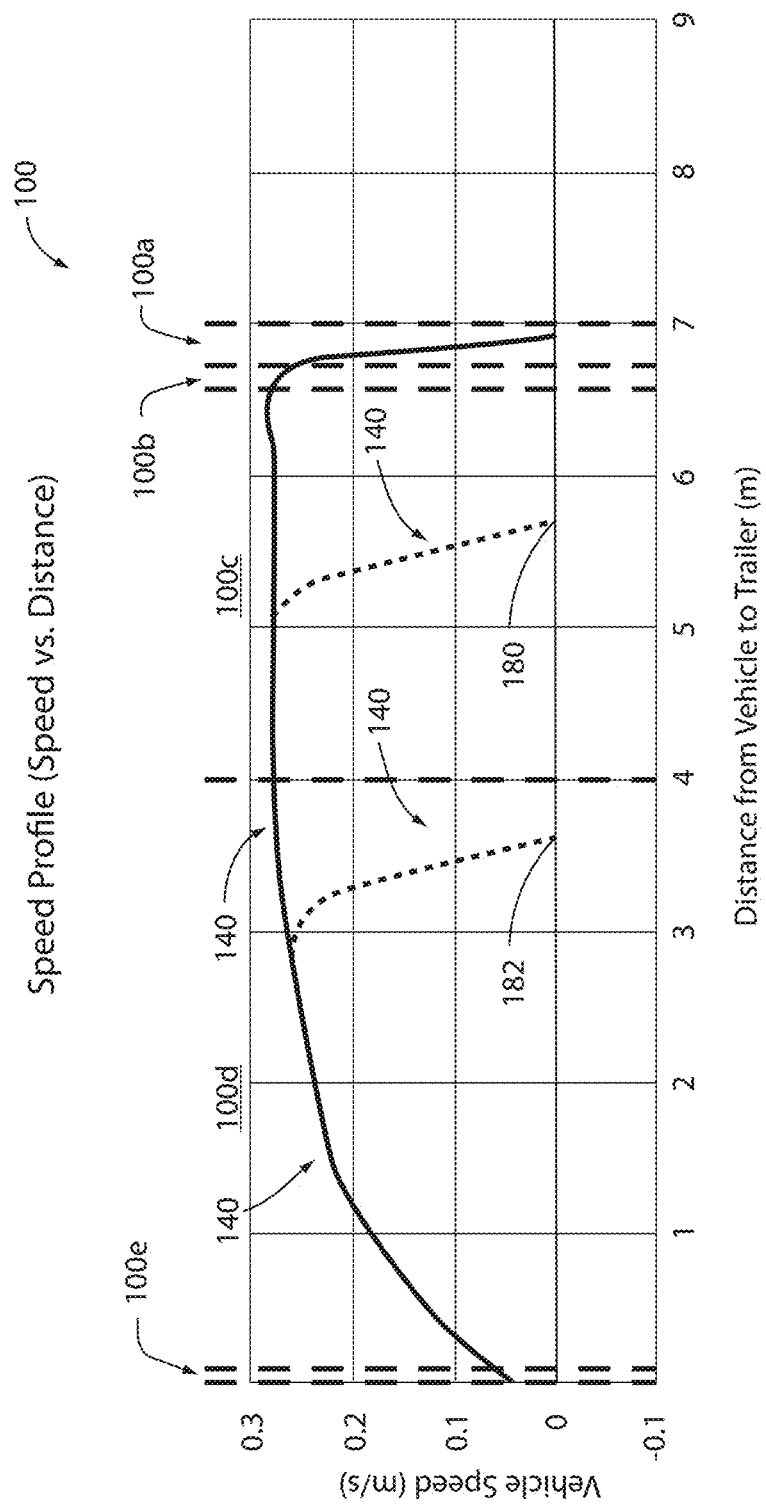
FIG. 6 is a motion control profile demonstrating a vehicle speed relative to a remaining distance to a target.

FIG. 5 demonstrates an aerial view of the vehicle 12 maneuvering in a reverse direction 102 toward an aligned position with the trailer 18. FIG. 6 demonstrates a plot of the velocity of the vehicle 12 in relation to the distance $D_C$ to the coupler 16. Referring to FIGS. 5 and 6, as previously discussed, the controller 14 may be configured to control an assisted or semi-autonomous operation of the vehicle 12 configured to align the hitch ball 22 with the coupler 16. Additionally, the controller 14 may be configured to control a motion profile 100 or acceleration profile of the vehicle 12 when approaching the trailer 18 as shown in FIG. 6. In this way, the controller 14 may be configured to accurately align the vehicle 12 with the trailer 18 without abrupt changes in acceleration or deceleration. Such changes may otherwise result in discomfort for passengers of the vehicle 12 and may also limit passenger perception of control of the system 10. Accordingly, in order to accurately control the motion of the vehicle 12, the controller 14 may control the vehicle throttle via the powertrain control system 64 and the brake control system 62 to achieve while monitoring each of a plurality of braking or motion control parameters of the vehicle 12. In this way, the system 10 may be configured to the motion profile 100 of the vehicle 12 to accurately stop the vehicle 12 with the hitch ball 22 aligned with the coupler 16 while maintaining a smooth acceleration or deceleration profile.

As shown in FIG. 6, the motion profile 100 may comprise an acceleration phase 100a in which the controller 14 controls the powertrain control system 64 to increase the throttle to achieve a predetermined acceleration increase. Once the vehicle speed begins to approach an operating speed, the controller 14 may control the powertrain control system 64 to decrease the throttle over an acceleration reduction phase 100b until a constant speed phase 100c is achieved. Once a predetermined stopping distance is reached (e.g. $D_C$ less than a predetermined distance), the controller 14 may initiate a deceleration phase 100d by controlling the brake control system 62. As shown in FIG. 6, the predetermined distance is $D_C \leq 4$ m. However, the distance at which the controller 14 activates the deceleration phase may vary based on a desired operating speed, deceleration rate, and various factors.

As illustrated, the deceleration rate of the deceleration phase 100d may begin gradually and increase in the rate of deceleration over time. In this configuration, the system 10 may provide for a minimized time to align the vehicle 12 with the trailer 18 and may also reduce the likelihood that the vehicle 12 stops short of alignment due to uneven operating terrain. As discussed herein, uneven terrain may correspond to various surface variations or terrain features (e.g. ruts, potholes, stones, etc.) that may inadvertently stop the vehicle 12 at the limited speed and corresponding inertia. Such limited speeds may be beneficial during the motion profile 100 to achieve the precisely controlled motion necessary to align the hitch ball 22 with the coupler 16. Accordingly, the controller 14 may be configured to maintain the speed of the vehicle 12 by increasing the deceleration at an increasing rate to limit stalls and unnecessarily long alignment times.

Finally, once the deceleration results in the velocity decreasing to zero, the stopping phase 100e is activated. At this time, the hitch ball 22 and the coupler 16 should also be in an aligned condition. Such alignment and accuracy may be achieved by accurately calculating the stopping distance of the vehicle 12 while monitoring the motion control or braking parameters to ensure alignment is achieved. An exemplary method of calculating the stopping distance of the vehicle 12 is discussed in reference to FIGS. 7A, 7B, and 7C. Once the distance $D_C$ is zero in the stopping phase 100e, the controller 14 requests the brake system controller 62 to increase the torque of the service brakes 62a to bring the vehicle to a complete stop. The final increase in brake pressure or torque may supplant or supersede the motion profile 100 of the deceleration phase 100d to ensure the precision of the stopping point.

By monitoring the braking or motion control parameters, the controller 14 may provide for the deceleration of the vehicle 12 to be applied as a smooth deceleration profile regardless of the vehicle's loading conditions and on various road surfaces (e.g., snow, grass, gravel, etc.) and grades. Such operation may require the brake control system 62 to consistently monitor the braking parameters such that the system 62 can detect variations and adjust the control of the service brakes 62a to stop the vehicle 12 via the smooth deceleration profile. In order to avoid variations in a deceleration rate and harsh braking of the vehicle 12, the brake control system 62 may detect variations in the braking parameters such that the brake control system 62 may change a timing and corresponding stopping distance required to stop the vehicle 12. In this way, the braking control system 62 may be configured to accurately stop the vehicle 12 with a consistent deceleration profile or rate and align the hitch ball 22 aligned with the coupler 16 even if one or more of the braking parameters changes during operation. As previously discussed, the braking parameters may include, but are not limited to, a traveling velocity, acceleration, distance $D_c$ to the coupler 16, current brake pressure, pressure build rate, minimum pressure to maintain standstill, vehicle mass, tire radius, an operating surface grade, terrain features of the operating surface, etc.

Referring again to FIG. 5, the vehicle 12 is shown applying a deceleration routine, wherein the velocity of the vehicle 12 is gradually reduced from a braking start time $t_0$ to a stop time $t_1$. The method to determine the pressure command may be derived by the difference between the braking start time $t_0$ to the stop time $t_1$ when the vehicle 12 is brought to a standstill. This method may control the vehicle 12 to align the hitch ball 22 with the coupler 16 to meet the alignment requirements of the maneuver (i.e., positioning the hitch ball 22 directly underneath the coupler 16). Thus, the vehicle 12 may avoid unnecessary harsh braking, which may cause driver discomfort.

Figure 7A:
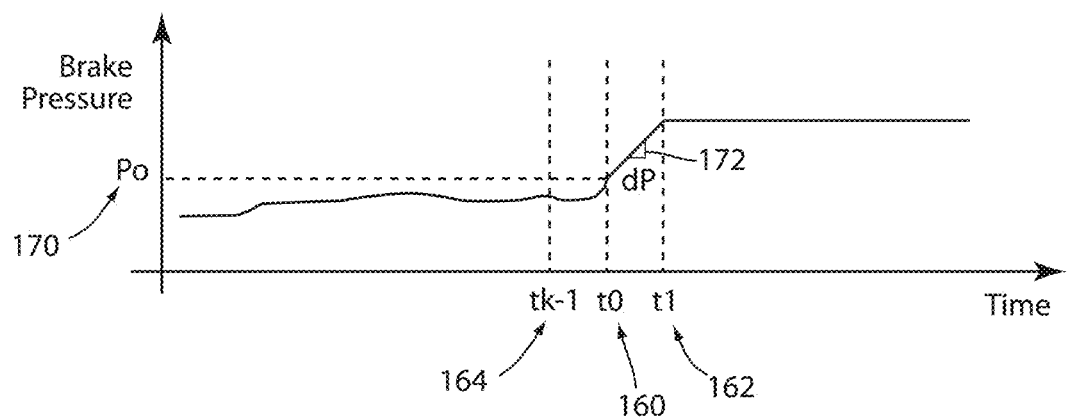
FIG. 7A is a line graph illustrating the brake pressure in relation to time.
Figure 7B:
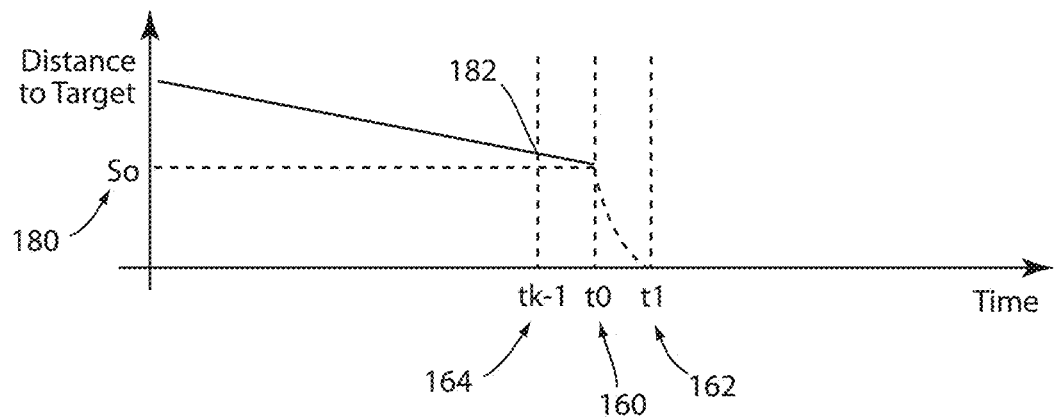
FIG. 7B is a line graph illustrating the distance to target in relation to time.
Figure 7C:
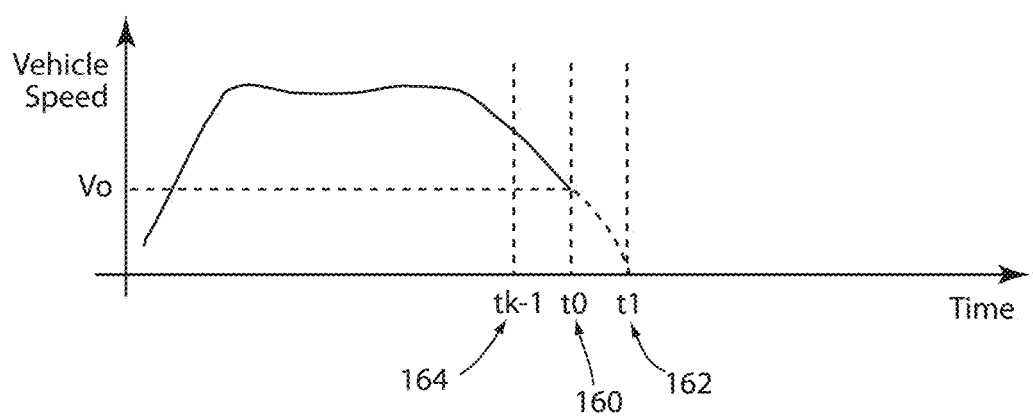
FIG. 7C is a line graph illustrating the vehicle speed in relation to time.

FIGS. 7A, 7B, and 7C are plots demonstrating time traces of key signals demonstrating the motion control of the vehicle 12 during deceleration. FIG. 7A illustrates how the brake pressure of the service brakes 62a is controlled based on the distance to the $D_c$ of the vehicle 12 to coupler 16. FIG. 7B illustrates the relationship between the distance to the target or the distance $D_c$ to the coupler 16 and time for reference in relation to the vehicle speed as shown in FIG. 7C. As shown, the braking system 62 may be configured to control the brake pressure as a substantially linear function of time. Accordingly, as the brake control system 62 linearly increases the brake pressure from $t_0$ to $t_1$, the distance to the target or distance $D_c$ may reach zero (FIG. 7B) as the velocity or vehicle speed reaches zero (FIC. 7C). As denoted, $t_0$ corresponds to the braking start time and $t_1$ corresponds to the standstill or stop time of the vehicle 12. The distance to the target denotes the distance $D_c$ between the hitch ball 22 and the coupler 16, which may be reduced to zero simultaneously or congruently with the velocity of the vehicle 12.

A method for the hitch assistance system 10 to stop the vehicle 12 during assisted or automatic hitching operation is now discussed in reference to FIGS. 5, 7A, 7B, and 7C. In operation, the deceleration of the vehicle 12 may be proportional to the applied braking pressure. Therefore, the deceleration of the vehicle 12 may be a linear function of time as well, according to the following equation:

$$a(t)=-K \cdot t, 0 \leq t \leq t_1-t_0 \qquad (3)$$

where a is the acceleration of the vehicle 12 (a<0 during braking), and K is jerk, which defines the absolute rate of change of acceleration. Accordingly, the velocity and the position of the vehicle 12 may be determined as integrals of the acceleration as shown in Equations 4 and 5.

$$v(t_1)=0=V_0-1/2K(t_1-t_0)^2 \qquad (4)$$

$$s(t_1)=0=S_0-V_0(t_1-t_0)+1/6K(t_1-t_0)^3 \qquad (5)$$

By rearranging the above equations and solving for $t_1-t_0$, the difference between the time $t_0$ and the time $t_1$ may yield the transition duration T of the transition. As previously introduced, the start time $t_0$ is when the vehicle braking operation begins and the stop time $t_1$ is when the transition to a standstill is complete. Accordingly, the controller 14 may be configured to calculate the stopping distance $D_s$ of the vehicle 12 such that the vehicle is stopped when the distance $D_C$ is zero.

Figure 8:
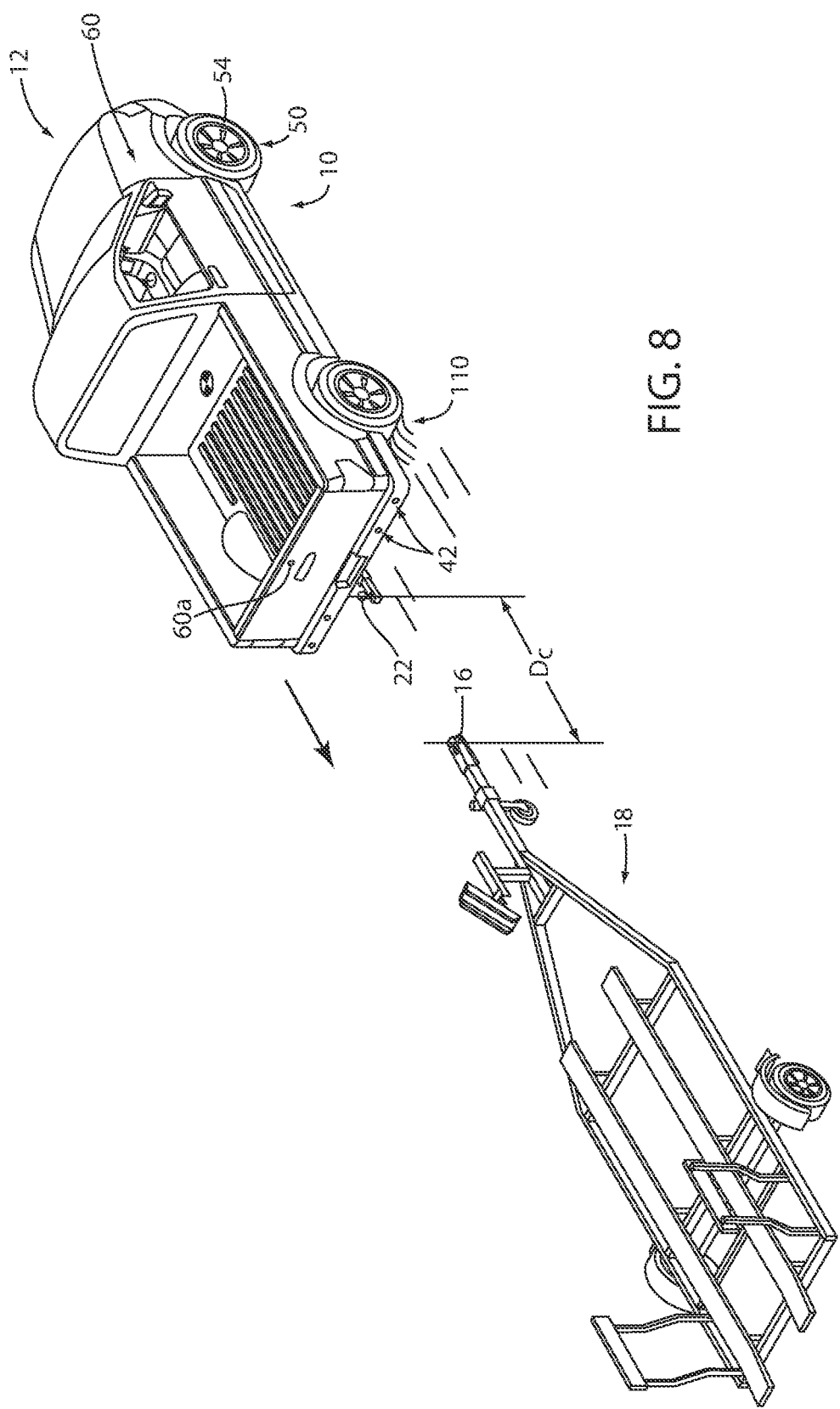
FIG. 8 is a projected view of a vehicle navigating toward a trailer and encountering an obstruction.

Referring now to FIG. 8, a projected view of the vehicle 12 is shown demonstrating the vehicle 12 encountering an uneven operating surface including an obstruction 110 or a variation in a terrain feature along the path 20 to the trailer 18. The obstruction 110 may correspond to an change in an operating surface or grade of the operating surface including a variation in a terrain feature (a rock, a root, organic material, curb, drain, etc.) that may be encountered by the vehicle 12. As previously discussed, the controller 14 may be configured to maintain the operating speed of the vehicle 12 during the alignment routine in order to avoid inadvertent stoppages of the vehicle 12 due to variation in the terrain. However, in some instances, the increased torque required to overcome or pass the obstruction 110 may be significant enough to stall the motion of the vehicle 12. Such a stoppage of the vehicle may be the result of a loss of traction or a throttle/torque requirement to overcome the obstacle exceeding a limit applied to the motion of the vehicle 12. The limits applied to the throttle of the vehicle 12 may correspond to general restrictions implemented throughout the semi-autonomous reverse operation or may correspond to operation specific throttle controls as later discussed in reference to FIG. 11. Additionally, in some implementations, the system 10 may be configured to adjust the motion profile 100 as introduced in FIG. 6 based on the distance $D_C$ to the coupler 16.

Figure 9:
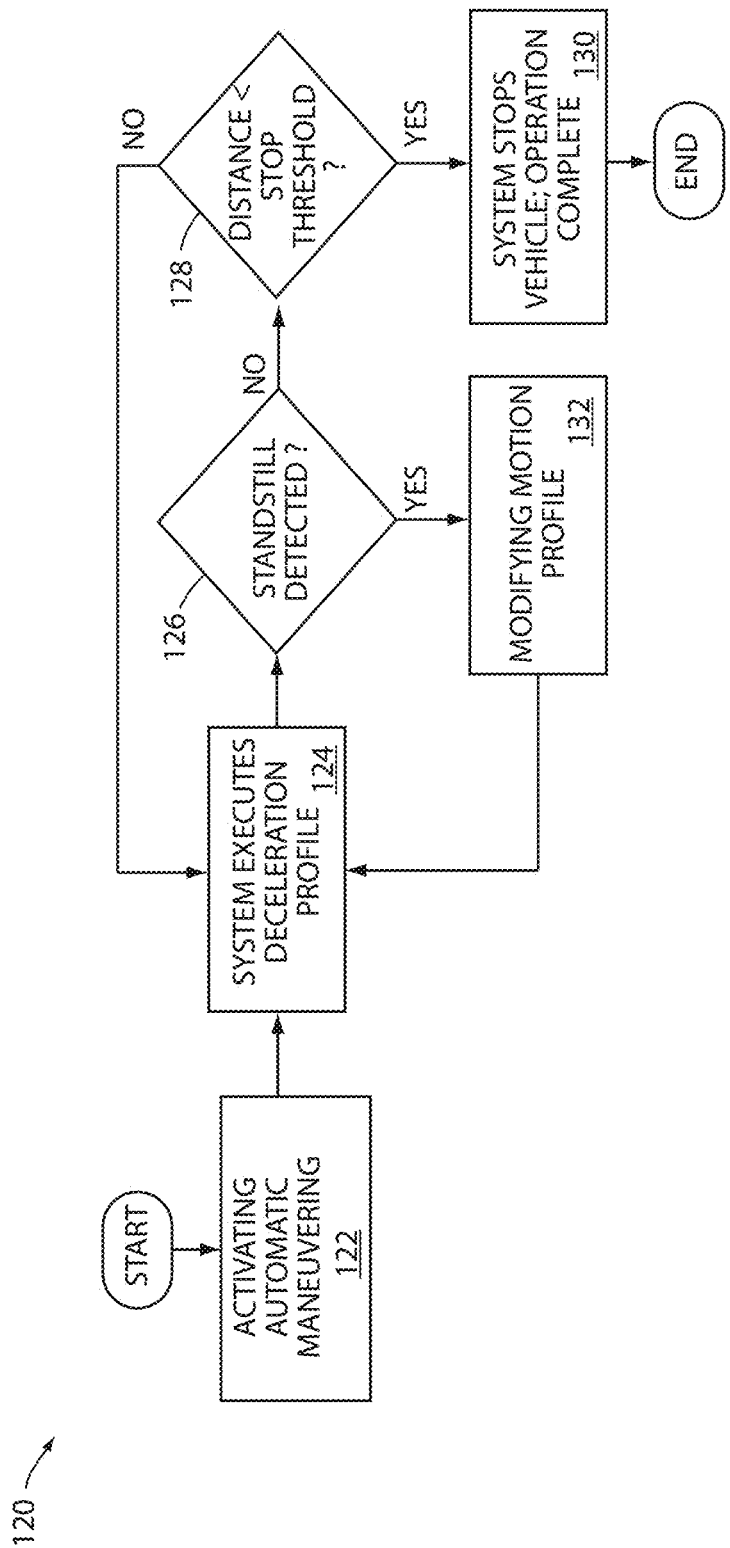
FIG. 9 is a flowchart of a method for controlling a motion of a vehicle in response to an unexpected stoppage or standstill condition.

FIG. 9 demonstrates a flowchart of a method 120 for controlling the motion profile 100 of the vehicle 12 in response to a standstill condition based on the remaining distance $D_C$ to the coupler 16. Referring now to FIGS. 6, 8 and 9, the method 120 may begin in response to a user activation of an assisted reverse operation of the vehicle 12 (122). In response to the activation of the reverse operation, the system 10 may control the vehicle 20 along the path 20 and estimate the distance $D_C$ to the coupler 16. Once the distance $D_C$ to the coupler 16 is less than a predetermined threshold, the controller 14 may execute the deceleration phase 100d of the motion profile 100 (124). During the deceleration phase 100d, the controller 14 may monitor the motion or braking parameters to determine if a standstill condition is detected (126). If the standstill condition is not detected, the controller 14 may continue to monitor the distance $D_C$ to the coupler 16 until the hitch ball 22 is in alignment with the coupler (128). Once alignment is achieved, the controller 14 may activate the stopping phase 100e and successfully complete the alignment operation (130).

If the standstill condition is detected in step 126 during the deceleration phase 100d, the controller 14 may modify the deceleration profile of the deceleration phase 100d (132). For example, if the vehicle 12 inadvertently comes to a stop prior to alignment (e.g. as a result of the obstruction 110), the controller 14 may calculate an updated motion profile to smoothly control the motion of the vehicle 12 to achieve alignment with the trailer 18. Details of the updated motion profile are further discussed in reference to FIGS. 10A and 10B. Following step 132, the controller 14 may return to step 124 to execute the updated motion profile and the deceleration phase 100d. In this way, the system 10 may be configured to recover from the standstill condition and align the hitch ball 22 with the coupler 16.

Figure 10A:
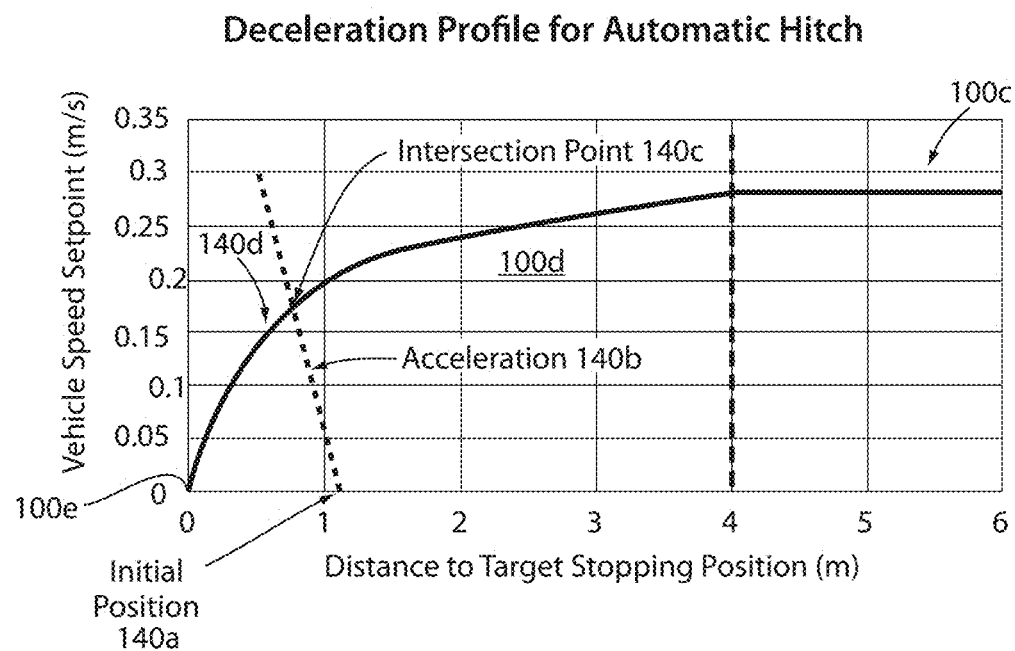
FIG. 10A is a deceleration profile of vehicle demonstrating a motion control recovery in response to an unexpected stoppage or standstill condition.
Figure 10B:
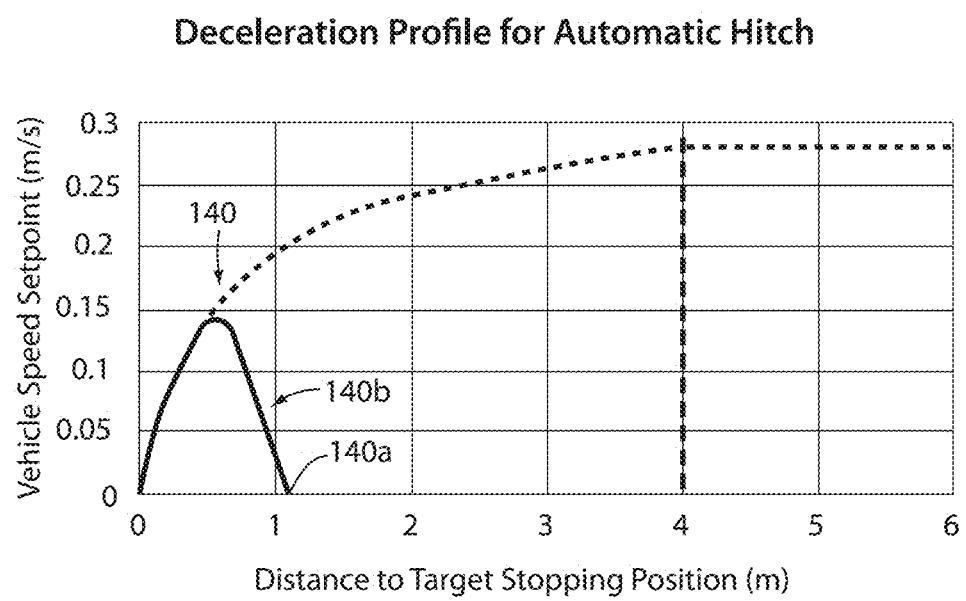
FIG. 10B is a deceleration profile of vehicle demonstrating a motion control recovery in response to an unexpected stoppage or standstill condition.

Referring now to FIGS. 10A and 10B, the deceleration phase 100d of the motion profile 100 is shown demonstrating a modified motion profile 140. In response to the standstill condition occurring, the controller 14 may identify the remaining distance $D_C$ to the coupler 16 indicated as the stop position 140a. From the stop position 140a, the controller 14 may calculate an intersection 140c between an acceleration profile 140b and a remaining deceleration profile 140d of the deceleration phase 100d. As shown in FIG. 10b, the modified motion profile may be calculated and/or applied by gradually transitioning the motion of the vehicle from the acceleration phase 140d to the remaining deceleration profile 140d. In this way, the modified motion profile 140 may be achieved by the controller 14 following the standstill condition of the vehicle 12. In order to notify the operator O of the vehicle 12 of each of the steps discussed herein, the system 10 may be configured to control the HMI 66 to display a variety of prompts and receive corresponding instructions from the user U to control the operation of the semi-autonomous reverse operations as discussed herein.

Figure 11:
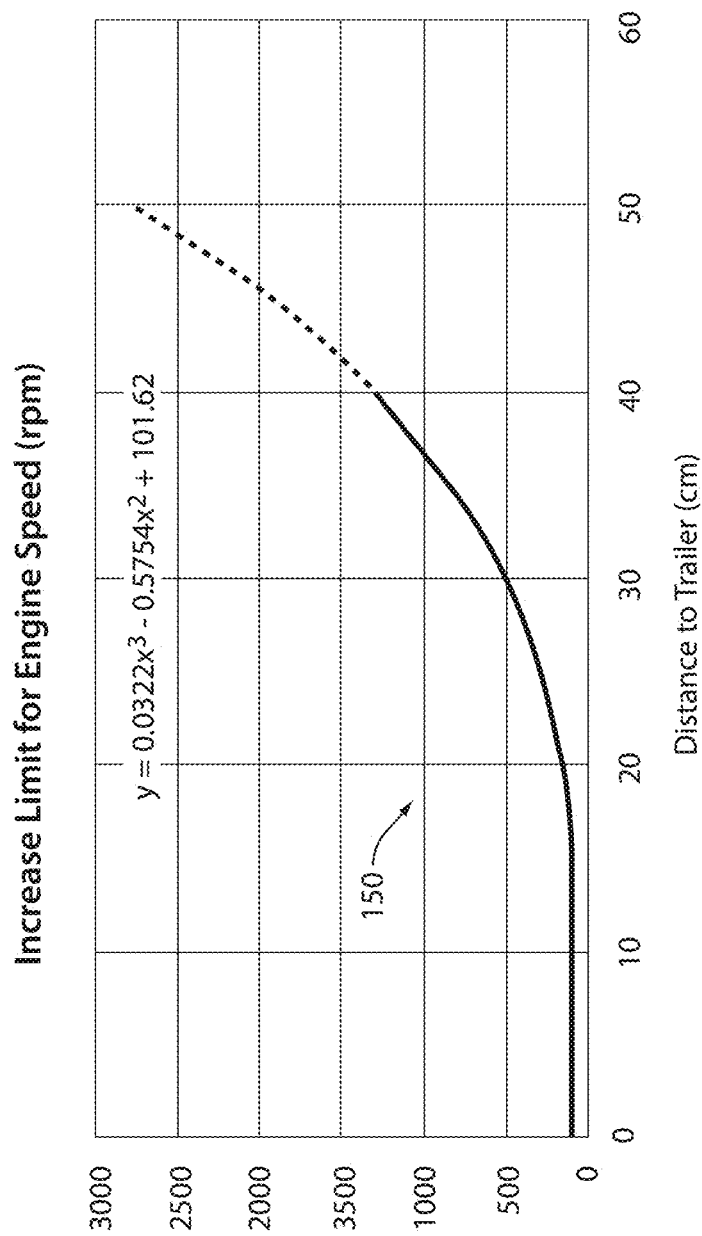
FIG. 11 is a chart demonstrating an engine speed limit applied by a motion control system based on a distance to a target.

Additionally, in order to prevent the vehicle 12 or the hitch ball 22 from overshooting the alignment with the coupler 16, the controller 14 may be configured to set engine speed or throttle limits on the powertrain control system 64. Such engine speed limits may correspond to a variety of predetermined limits that may vary based on the loading conditions, brake performance, or various braking parameters. As shown in FIG. 11, the engine speed limits may be limited to a predetermined engine speed (e.g. revolution per minute [RPM]) based on the remaining distance $D_C$ to the coupler 16. For example, the engine speed of the vehicle 12 may be controlled by the controller 14 such that the engine speed is controlled to a decreased maximum operating value as the distance $D_C$ to the coupler 16 approaches zero or alignment. In this configuration, the controller 14 may be restricted from increasing the engine speed of the vehicle 12 to overcome the obstruction 110 in conditions that may result in the vehicle overshooting the aligned configuration with the trailer 18.

As shown, the engine speed of the vehicle 12 may be controlled based on a speed control curve 150. The speed control profile 150 may demonstrate an operating limit of the engine speed, which may ensure that the motion profile 100 and the modified motion profile 140 are applied within limits that can be controlled without causing an overshoot condition. As shown, the speed control profile 150 is represented by a smoothly increasing curve at distances of $D_C$ in excess of 10-20 cm. However, the speed control profile 150 may correspond to a variety of functions (linear, step, exponential) and/or control values in a table that may be compared by the controller 14 to limit the engine speed of the vehicle 12 based on the remaining distance $D_C$ to the coupler 16.

Figure 12:
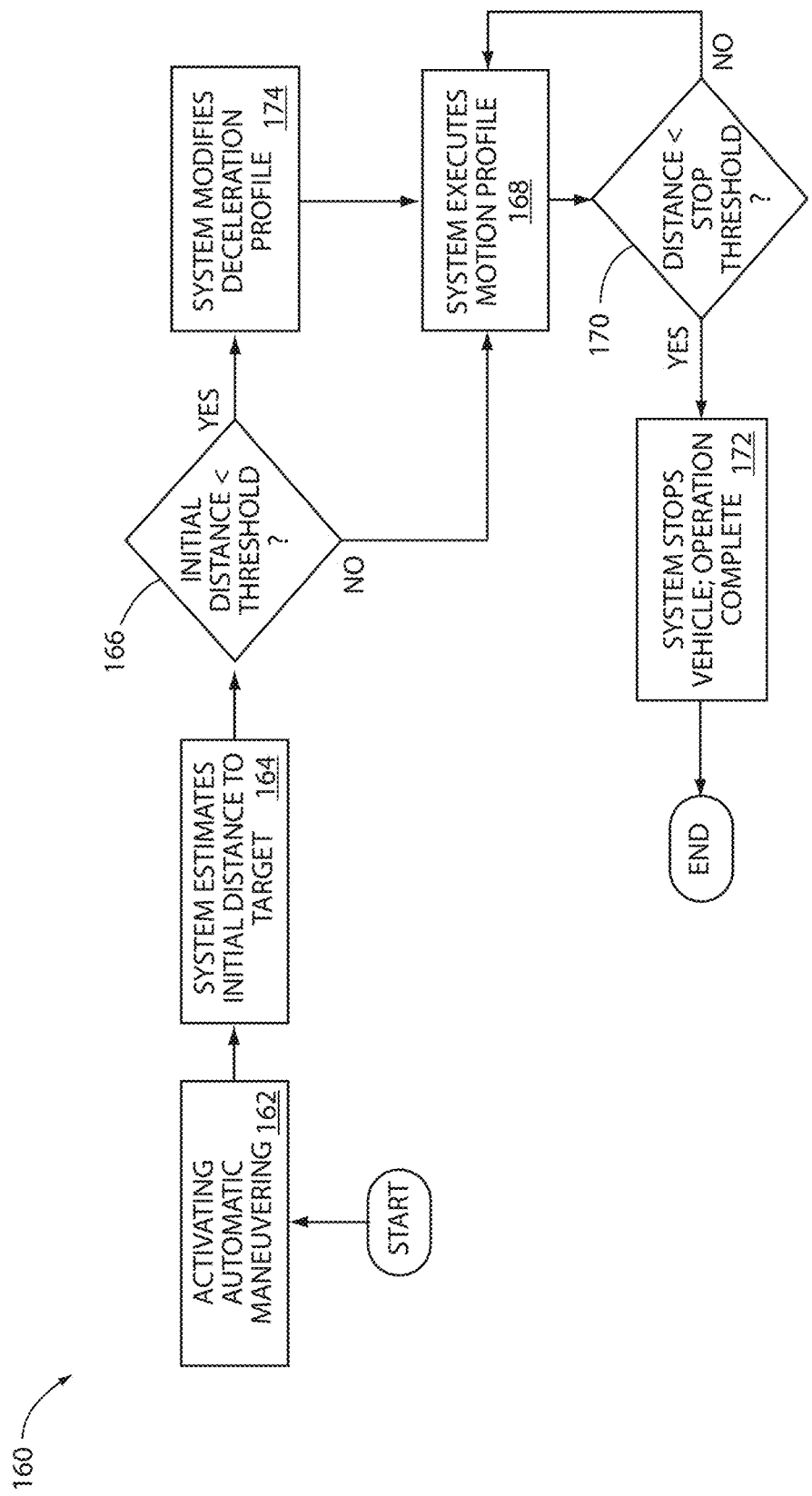
FIG. 12 is a flowchart of a method for updating a motion of a vehicle based on a remaining distance to a target in accordance with the disclosure.

Referring now to FIG. 12, a method 160 for updating the motion profile 100 based on the distance $D_C$ to the coupler 16 is shown. Similar to the standstill condition previously discussed, the operating routine 90 of the vehicle 12 may be activated by the user U with the distance $D_C$ to the coupler 16 which is insufficient to complete the entire motion profile 100. Referring now to FIGS. 6 and 12, the method 160 may begin in response to a user activation of an assisted reverse operation of the vehicle 12 (162). In response to the activation of the reverse operation, the system 10 may estimate the distance $D_C$ to the coupler 16 (164). Following the estimation of the distance $D_C$ to the coupler 16, the controller 14 may determine whether the distance $D_C$ is sufficient to complete the entire motion profile 100 or if the motion profile is to be modified (166). If the distance $D_C$ to the coupler 16 is greater than a predetermined distance threshold (e.g. 1-8 meters), the controller 14 may initiate the motion profile 100 (168) and monitor the distance $D_C$ to the coupler 16 (170). Once the distance $D_C$ to the coupler 16 is approximately zero or less than a stopping distance threshold, the controller 14 may activate the stopping phase 100e and successfully complete the alignment operation (172).

If the distance $D_C$ to the coupler 16 is less than a predetermined distance threshold (e.g. 1-10 meters) required for the complete motion profile, the controller 14 may modify the motion profile 100 to generate the modified motion profile 140 (174). The modified motion 140 profile may be similar to that previously discussed in reference to FIG. 11. For example, as illustrated in FIG. 6, the modified motion profile 140 may be generated based on a number of initial distances $D_C$ (180, 182) to the coupler 16. Based on the remaining distance $D_C$ to the coupler 16, the controller may apply the predetermined acceleration profile 140b to accelerate the vehicle until the speed of the vehicle converges with the remaining portion of the motion profile 100. In this way, the controller 14 may be configured to update the motion profile based on a variety of distances $D_C$ to the coupler 16 or various targets to which the navigation of the vehicle 12 is directed.

Accordingly, referring still to FIG. 12, the controller 14 may be configured to modify the motion profile 100 based on the distance $D_C$ to the coupler 16. In this way, the system 10 may provide for the smooth motion profile when the distance to the alignment with the coupler 16 of the trailer 18 varies. Following the calculation of the modified motion profile 140, the controller 14 may continue to step 168 to initiate the modified motion profile 140 to maneuver the vehicle 12 in an aligned configuration with the trailer 18. The method 160 may then continue to control the motion of the vehicle 12 according to the modified motion profile 140 until the hitch ball 22 is aligned with the coupler 16. It will be understood by one having ordinary skill in the art that construction of the described concepts, and other components, may not be limited to any specific material. Other exemplary implementations of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary implementations, is illustrative only. Although only a few implementations of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary implementations without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle control system configured to control a braking operation of a hitch ball to a coupler on a trailer comprising:
   a controller in communication with a maneuvering system and a sensor system, the controller configured to:
   control the maneuvering system to maneuver of a vehicle along a vehicle path;
   monitor a coupler distance from the hitch ball to the coupler via the sensor system;
   control a deceleration procedure configured to decrease a velocity of the vehicle along a deceleration profile and stop the vehicle with the hitch ball aligned with the coupler;
   detect a premature stop condition of the vehicle, wherein the coupler distance is greater than zero and the vehicle unexpectedly decelerates in excess of the deceleration profile as a result of a variation in an operating surface of the vehicle that is encountered by the vehicle along the vehicle path;
   control the vehicle to accelerate in response to the premature stop condition; and
   in response to the acceleration increasing the velocity of the vehicle intersecting the deceleration profile, control the deceleration procedure to decrease the velocity of the vehicle along the deceleration profile.

2. The vehicle control system according to claim 1, wherein the deceleration profile comprises a predetermined rate of the velocity of the vehicle dependent on the coupler distance.

3. The vehicle control system according to claim 1, wherein the deceleration profile comprises an increasing rate of deceleration in response to a decrease of the coupler distance.

4. The vehicle control system according to claim 1, wherein the controller is further configured to:
   calculate an intersection with the deceleration profile based on a predetermined acceleration rate.

5. The vehicle control system according to claim 4, wherein the controlling of the vehicle to accelerate is based on the predetermined acceleration rate.

6. The vehicle control system according to claim 1, wherein the controller is further configured to:
   limit an engine speed of the vehicle through at least a portion of the maneuvering of the vehicle.

7. The vehicle control system according to claim 6, wherein the limit of the engine speed of the vehicle decreases relative to a remaining portion of the coupler distance.

8. The vehicle control system according to claim 6, wherein the engine speed is limited in addition to the velocity of the vehicle throughout the maneuvering of the vehicle.

9. The vehicle control system according to claim 6, wherein the engine speed is limited to prevent an overshoot of the coupler distance resulting in the hitch ball passing a location of the coupler.

10. The vehicle control system according to claim 1, wherein the controller is further configured to:
    detect at least one change in a braking parameter of the vehicle; and
    in response to the change in the braking parameter, adjust the deceleration profile based on a change in a stopping distance resulting from the change in the braking parameter.

11. The vehicle control system according to claim 10, wherein the braking parameter comprises at least one of a change in the velocity, a change in a brake pressure, a change in a grade of an operating surface of the vehicle, and a terrain feature encountered by the vehicle.

12. A method for controlling a braking operation of a vehicle comprising:
    controlling a maneuver of the vehicle along a vehicle path;
    monitoring a coupler distance from a hitch ball to a coupler;
    initiating a deceleration procedure configured to decrease a velocity of the vehicle along a deceleration profile and stop the vehicle with the hitch ball aligned with the coupler;
    detecting a premature stop condition of the vehicle, wherein the coupler distance is greater than zero and the vehicle unexpectedly decelerates in excess of the deceleration profile;
    controlling the vehicle to accelerate; and
    in response to the acceleration increase in the velocity of the vehicle intersecting the deceleration profile, controlling the deceleration procedure to decrease the velocity of the vehicle along the deceleration profile.

13. The method according to claim 12, wherein the deceleration profile comprises a predetermined rate of the velocity of the vehicle dependent on the coupler distance and the deceleration profile comprises an increasing rate of deceleration in response to decreasing the coupler distance.

14. The method according to claim 12, further comprising:
calculating an intersection with the deceleration profile based on a predetermined acceleration rate.

15. The method according to claim 14, wherein the controlling of the vehicle to accelerate is based on the predetermined acceleration rate.

16. The method according to claim 12, further comprising:
limiting an engine speed of the vehicle through at least a portion of the maneuvering of the vehicle.

17. The method according to claim 16, wherein the limit of the engine speed of the vehicle decreases relative to a remaining portion of the coupler distance.

18. The method according to claim 16, wherein the engine speed is limited in addition to the velocity of the vehicle throughout the maneuvering of the vehicle.

19. A vehicle control system configured to control a braking operation of a hitch ball to a coupler on a trailer comprising:
a controller in communication with a maneuvering system and a sensor system, the controller configured to:
control the maneuvering system to maneuver a vehicle along a vehicle path over an operating terrain;
monitor a coupler distance from the hitch ball to the coupler via the sensor system;
limit an engine speed of the vehicle through at least a portion of the maneuvering of the vehicle, wherein the limit of the engine speed of the vehicle decreases relative to the coupler distance;
detect a premature stop condition of the vehicle, wherein the coupler distance is greater than zero and the vehicle inadvertently is stopped as a result of the operating terrain and the limit of the engine speed;
control the vehicle to accelerate in response to the premature stop condition; and
in response to the acceleration increasing a velocity of the vehicle intersecting a deceleration profile, control a deceleration procedure configured to decrease the velocity of the vehicle along the deceleration profile and stop the vehicle with the hitch ball aligned with the coupler.

* * * * *